United States Patent
Moldenhauer et al.

(10) Patent No.: US 7,565,223 B2
(45) Date of Patent: Jul. 21, 2009

(54) METHODS AND SYSTEMS FOR HANDLING A WORK PIECE FOR A MACHINING PROCESS

(75) Inventors: John Moldenhauer, Maynard, MA (US); Clayton C. Cooper, Clifton Park, NY (US); Thomas Marcella, Mechanicville, NY (US)

(73) Assignee: Applied Robotics, Inc., Glenville, NY (US)

( * ) Notice: Subject to any disclaimer, the term of this patent is extended or adjusted under 35 U.S.C. 154(b) by 172 days.

(21) Appl. No.: 11/470,553

(22) Filed: Sep. 6, 2006

(65) Prior Publication Data
US 2008/0058986 A1 Mar. 6, 2008

(51) Int. Cl.
*G06F 19/00* (2006.01)
(52) U.S. Cl. .................. 700/245; 700/247; 700/248; 219/69.12
(58) Field of Classification Search ................. 700/245; 219/69.12
See application file for complete search history.

(56) References Cited

U.S. PATENT DOCUMENTS

| | | | |
|---|---|---|---|
| 4,685,663 A | 8/1987 | Jorgensen | |
| 5,307,565 A | 5/1994 | Erbrick et al. | |
| 2004/0216623 A1* | 11/2004 | Hurst et al. | 100/29 |
| 2008/0053962 A1* | 3/2008 | Cooper et al. | 219/69.12 |

OTHER PUBLICATIONS

Mack, Minimally Invasive and Robotic Surgery, 2001, Internet. p. 568-572.*
Casanueva et al., Analysis, design and experimental results of a high-frequency power supply for spark erosion, 2005, IEEE, p. 234-238.*
SME, Electrical Discharge Machining, 2001, Internet, p. 1-23.*
International Search Report for corresponding International application PCT/US07/77780 mailed on Aug. 6, 2008.
Written Opinion for corresponding International application PCT/US07/77780 mailed on Aug. 6, 2008.

* cited by examiner

*Primary Examiner*—Khoi H. Tran
*Assistant Examiner*—McDieunel Marc
(74) *Attorney, Agent, or Firm*—Heslin Rothenberg Farley & Mesiti P.C.

(57) ABSTRACT

Automated handling systems and methods for using the handling systems for handling a work piece in a machining process, for example, an electrical discharge machining (EDM) process, are provided. The handling systems include a robotic manipulator adapted to grasp a work piece and locate the work piece in a machining operation, such as, an EDM machining operation. The robotic manipulator includes tooling having gripping devices adapted to grasp and position the work piece so that the work piece can be transferred and positioned, for example, precisely positioned, whereby accurate machining of the work piece can be practiced with little or no custom tooling. Methods for handling a work piece are also disclosed.

14 Claims, 11 Drawing Sheets

METHODS AND SYSTEMS FOR HANDLING A WORK PIECE FOR A MACHINING PROCESS

TECHNICAL FIELD

This invention relates to work piece handling systems and methods for using work piece handling systems. Particularly, the invention relates to automated handling systems adapted to engage and position work pieces for machining processes, for example, for electrical discharge machining processes.

BACKGROUND OF THE INVENTION

Advancements in fabrication methods have yielded many automated machining processes that reduce the time and manpower required while increasing production rate. Many of theses automated machining processes, for example, milling and boring, typically require that the work piece being machined be precisely located whereby the automated, typically, computer programmed, machine tool yields the desired piece part having the desired features and dimensions. In order to provide the desired precise location of work pieces for access by the tool, for example, in the "machining cell" or "machining center," work pieces are often mounted in a fixture or tooling. The fixture or tooling holding the part, for example, by means of set screws or similar retaining hardware, can then be mounted in the machine tool and the machining practiced with reference to the datum provided by the tooling.

Often, the cost of tooling for mounting the work piece to the machine tool can be a significant part of the cost of the machining operation. For example, in some machining processes, each work piece must be mounted in its own set of tooling prior to machining whereby numerous tools or sets of tools must be provided for a run of a specific work piece.

One typical machining process that may require multiple tools or sets of tools to machine multiple work pieces, typically, one at a time, is the Electrical Discharge Machining process (that is, the "EDM process"). As described, for example, in one on-line encyclopedia, the EDM process is ... a nontraditional method of removing material by a series of rapidly recurring electric arcing discharges between an electrode (the cutting tool) and the work piece, in the presence of an energetic electric field. The EDM cutting tool is guided along the desired path very close to the work but it does not touch the piece. Consecutive sparks produce a series of micro-craters on the work piece and remove material along the cutting path by melting and vaporization. The particles are washed away by the continuously flushing dielectric fluid.

[http://en.wikipedia.org/wiki/Electrical_discharge_machining]

In order to precisely locate the work piece relative to the EDM tool, that is, typically a wire electrode, the work piece that is to be EDM machined is typically mounted in a fixture or tool that is then mounted in the EDM tank containing the dielectric fluid, typically water or kerosene. That is, when multiple work pieces are to be EDM machined, multiple tools or sets of tools must be provided to mount the individual work pieces before mounting the tooling and work piece into the EDM machine. Though this disadvantage characterizes certain EDM machining processes, for example, wire-type EDM processes, other machining processes that require tooling are also hampered by this requirement.

Aspects of the present invention overcome the above disadvantages of conventional traditional and nontraditional machining processes. As will be discussed below, aspects of the present invention obviate the need for supplying and handling multiple tools or tool sets when preparing work pieces for machining, for example, EDM machining. This and other advantages of aspects of the invention will become apparent upon review of the aspects and details of the aspects discussed below.

SUMMARY OF THE INVENTION

The aforementioned benefits of the present invention are achieved by utilizing the methods and systems for handling a work piece according to aspects of the present invention. One aspect of the invention is a method for handling a work piece for a machining process, the method including providing the work piece in a first position; grasping the work piece with a first automated gripping device mounted to a robotic manipulator; transferring the work piece with the robotic manipulator from the first position to a second position where the work piece can be accessed by a machine tool; and grasping the work piece in the second position with a second automated gripping device wherein the work piece is positioned for machining by the machine tool. The machine tool may comprise an EDM tool, for example, a wire EDM tool.

Another aspect of the invention is a system for handling a work piece for a machining process, the system including: a robotic manipulator; a first automated gripping device mounted to the robotic manipulator and adapted to grip a work piece located in a first position; a second automated gripping device adapted to receive and retain the work piece in a second position for machining by a machine tool; and means for controlling the operation of the robotic manipulator, the first gripping device, and the second gripping device to position the first gripping device whereby the first gripping device can grip the work piece, the robotic manipulator can transfer the work piece from the first position to the second position, and the second gripping device can grip the work piece to retain the work piece in the second position whereby the work piece can be machined by the machine tool. The machining process may comprise an EDM machining, for example, a wire EDM machining process.

BRIEF DESCRIPTION OF THE DRAWINGS

The subject matter, which is regarded as the invention, is particularly pointed out and distinctly recited in the claims at the conclusion of the specification. The foregoing and other aspects, features, and advantages of the invention will be readily understood from the following detailed description of embodiments of the invention taken in conjunction with the accompanying drawings in which:

DETAILED DESCRIPTION

Figure 1:
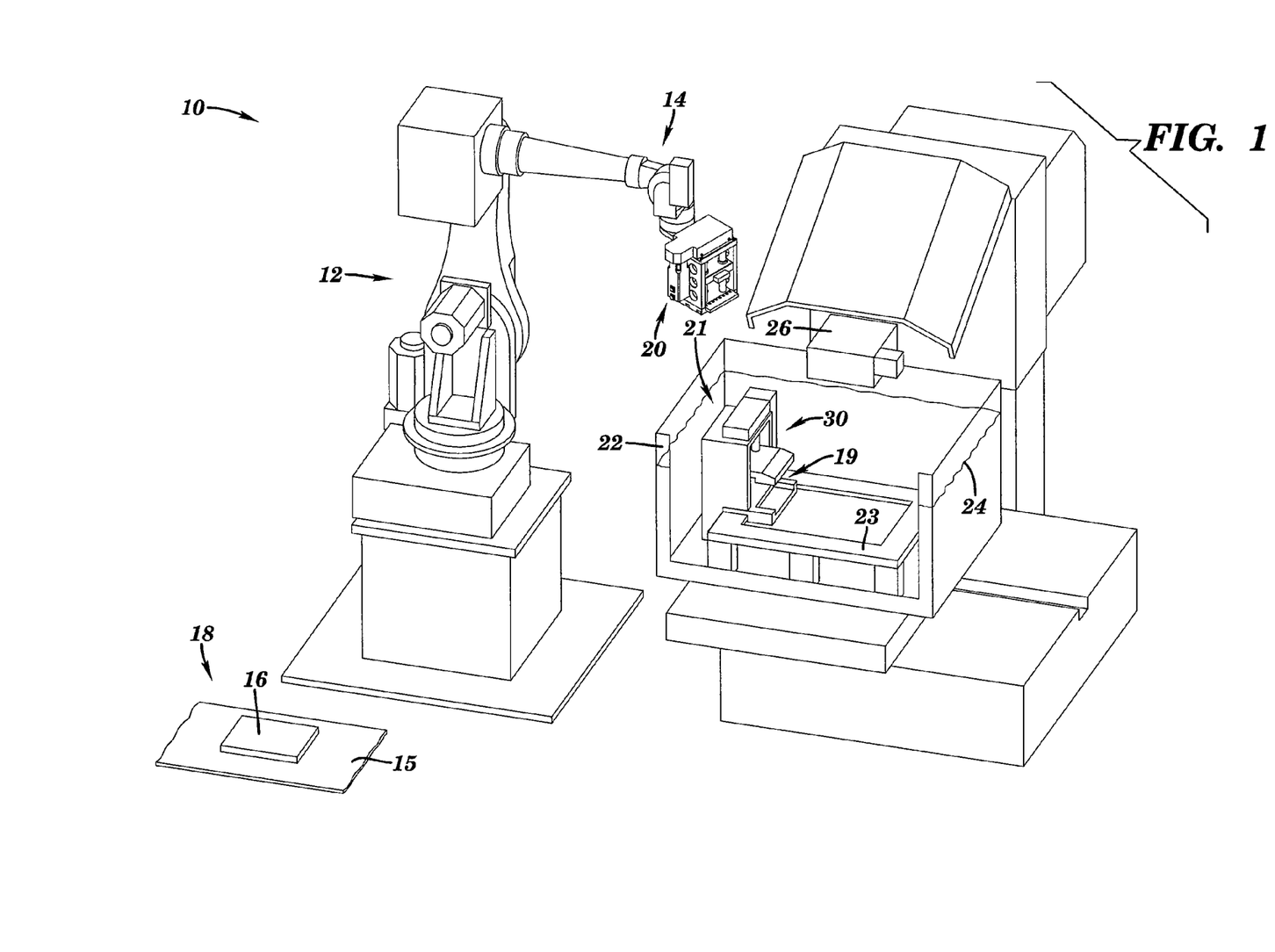
FIG. 1 is a perspective view of a system for handling work pieces for a machining process according to one aspect of the invention.

FIG. 1 is a perspective view of a system 10 for handling work pieces for a machining process according to one aspect of the invention. Though the following discussion may describe aspects of the invention as they pertain to the electrical discharge machining (EDM) process, as will be recognized by those skilled in the art of work piece handling and machining, aspects of the invention may also be applied to the handling of any work piece for introduction or removal from any machining operation or treatment, including, but not limited to, milling, drilling, turning, cutting, or other conventional machining process, or inspection, cleaning, painting, and like conventional treatments.

As shown in FIG. 1, according to one aspect, system 10 includes at least one robotic manipulator 12 having an arm end 14 adapted to receive a tool and transfer a work piece 16 from a first position 18 to a second position 19 in a machining station 21. Work piece 16 may typically be a plate, a blank, a billet, a bar, a piece part, a component, a partially machined part, or the like material that is to be machined. In one aspect, where the machining comprises EDM machining, work piece 16 is a conductive material, such as, a metal or conductive plastic. Though an articulated arm-type robotic arm is shown in FIG. 1, for example, an M710i robot provided by FANUC or its equivalent, robotic manipulator 12 may comprise any device adapted to manipulate a tool, including a gantry-type device. In the following discussion, though the devices of the invention may be mounted to any conventional manipulator, robotic manipulator 12 will simply be referred to as "robot 12."

In the aspect of the invention shown in FIG. 1, the tool comprises a gripping device 20 adapted to be mounted to arm end 14. One typical gripping device 20 that may be employed in aspects of the invention is shown in and described with respect to FIGS. 2 through 6 below. The first position 18 may comprise a storage location or a feed conveyor 15, for example, a belt conveyor, though any conventional conveying means may be used. Second position 19 in machining station 21 may comprise one or more positions wherein a machining process, for example, milling, drilling, turning, cutting, or other conventional machining process or treatment, for example, inspection, cleaning, painting, and like treatments, may be performed on work piece 16.

In the aspect of the invention shown in FIG. 1, the second position 19 comprises one or more treatment vessels 22, for example, one or more treatment vessels containing a fluid having a fluid level 24. In FIG. 1, vessel 22 is shown with one side panel removed to facilitate illustration of aspects of the invention. In one aspect, treatment tank or vessel 22 comprises an EDM machining vessel having an EDM tool 26 having an electrode, for example, a wire EDM tool provided by Fanuc or Mitsubishi, or its equivalent, and a dielectric fluid, for example, water or kerosene. As shown in FIG. 1, vessel 22 may typically contain at least one gripping device 30. Gripping device 30 is adapted to receive and retain work piece 16 transferred by robot 12. One typical gripping device 30 that may be employed in aspects of the invention is shown in and described with respect to FIGS. 7 through 11 below.

According to one aspect of the invention, a method is provided for handling work piece 16 in an electrical discharge machining process by providing work piece 16 in a first position 18; grasping work piece 16 with a first automated gripping device 20 mounted to a robotic manipulator 12; transferring work piece 16 with the robotic manipulator 12 from the first position 18 to the second position 19; and grasping the work piece in second position 19 with a second automated gripping device 30 wherein the work piece 16 is positioned for electrical discharge machining by EDM tool 26.

Figure 2:
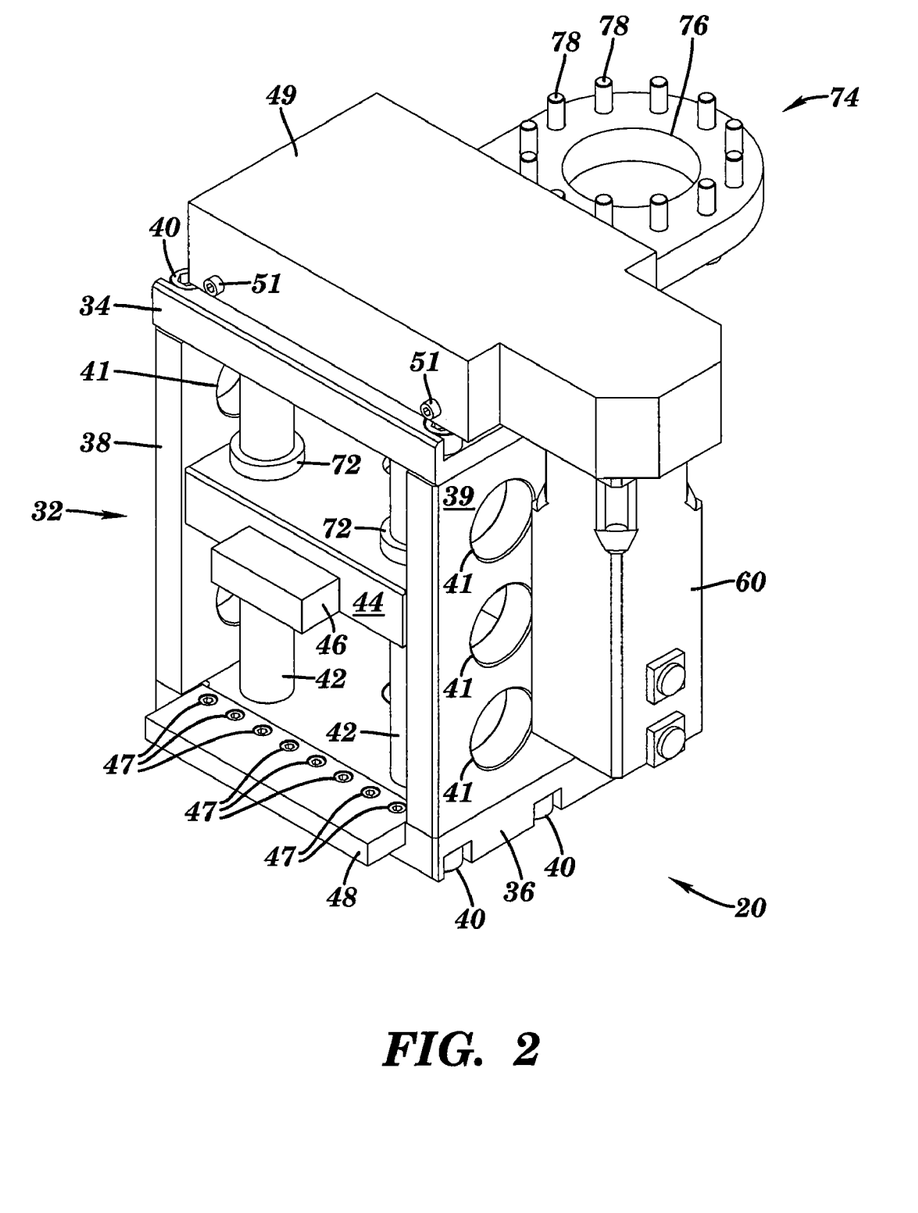
FIG. 2 is a perspective view of one gripping device that may be used in the system shown in FIG. 1.
Figure 3:
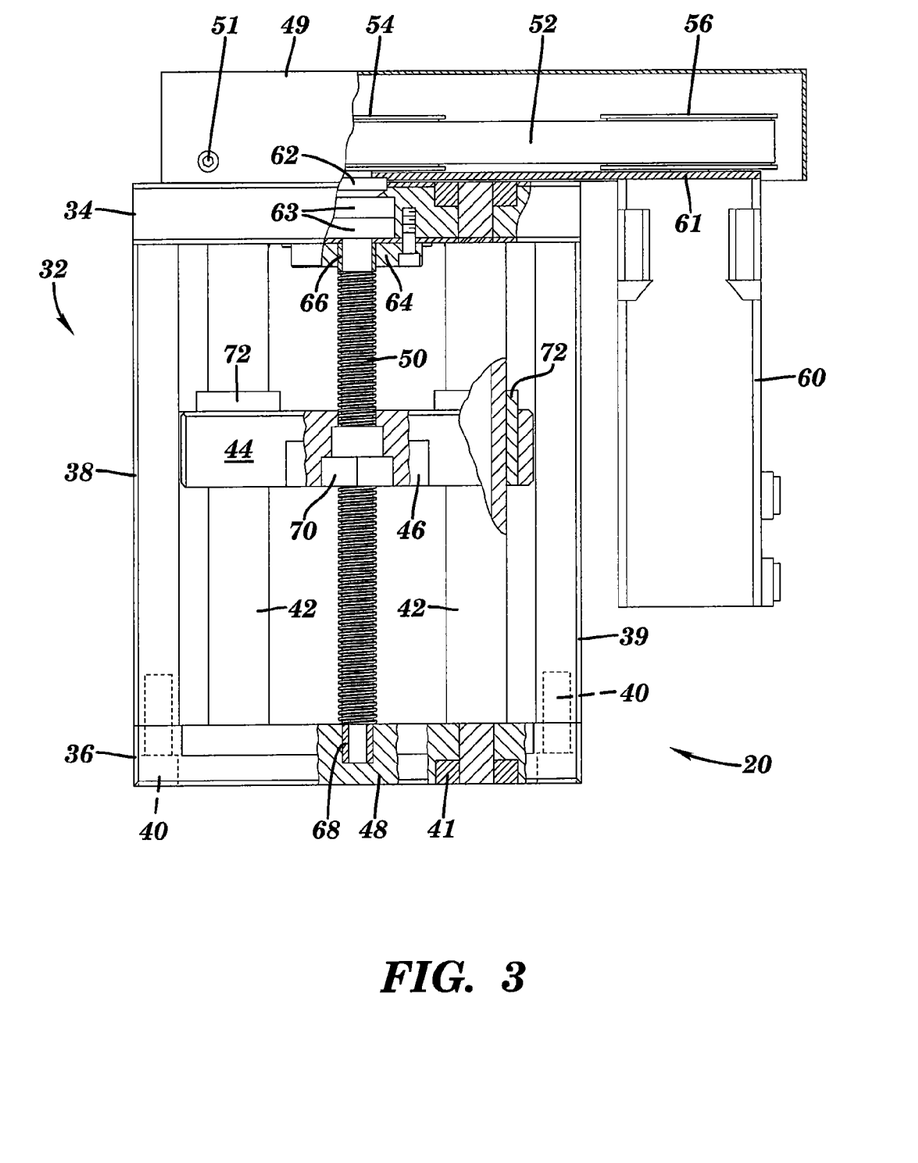
FIG. 3 is a front elevation view, partially in cross section, of the gripping device shown in FIG. 2.
Figure 4:
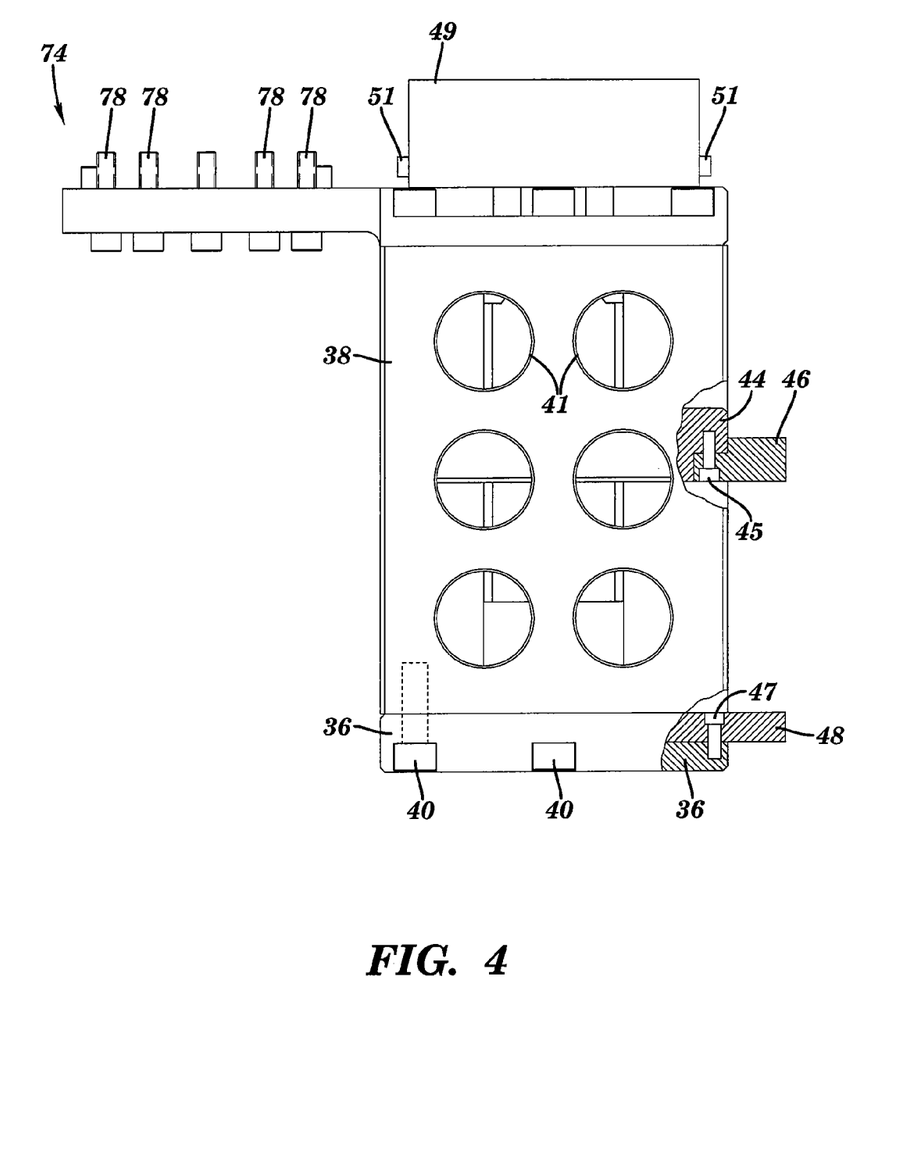
FIG. 4 is a left side elevation view, partially in cross section, of the gripping device shown in FIG. 2.
Figure 5:
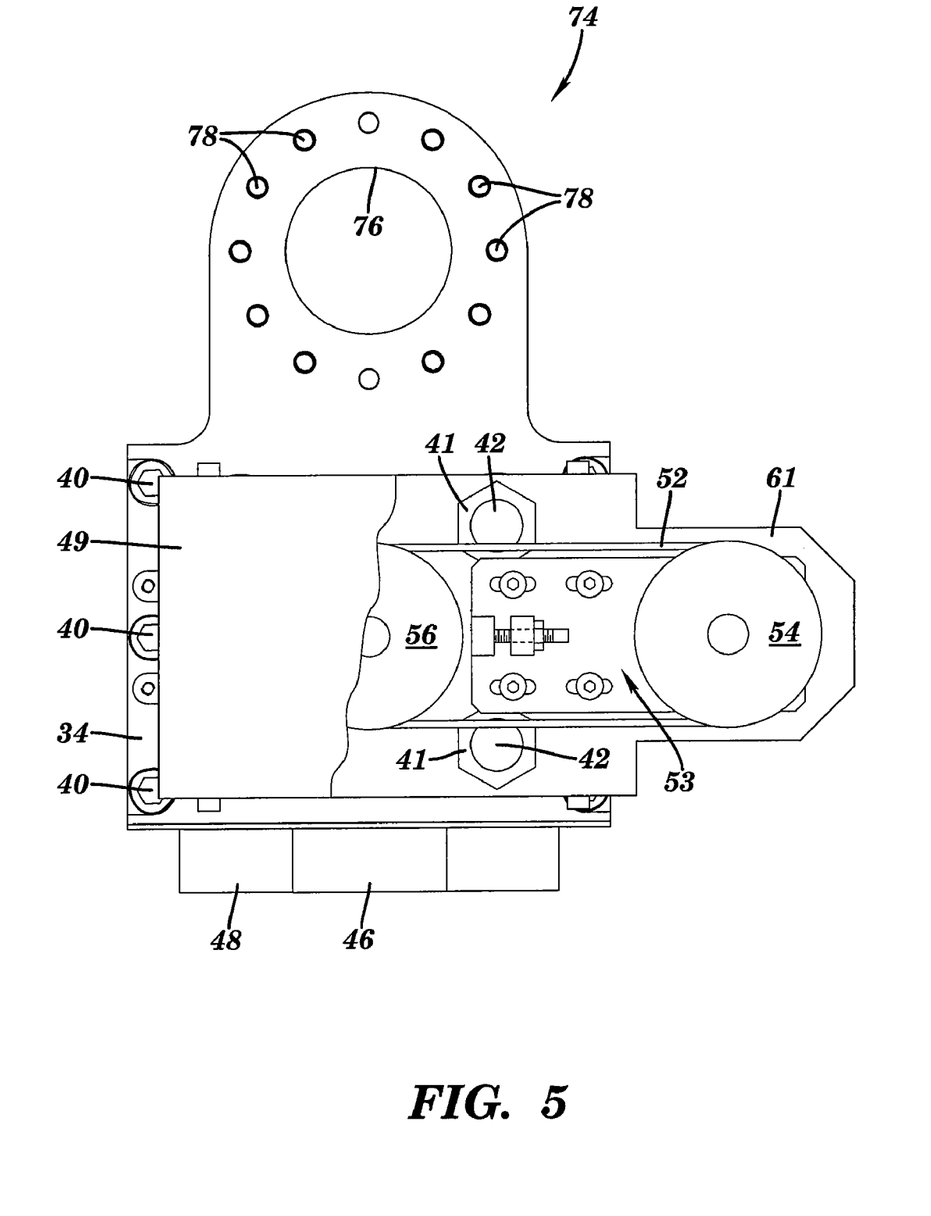
FIG. 5 is a top plan view of the gripping device shown in FIG. 2, with a cover partially removed to show details.
Figure 6:
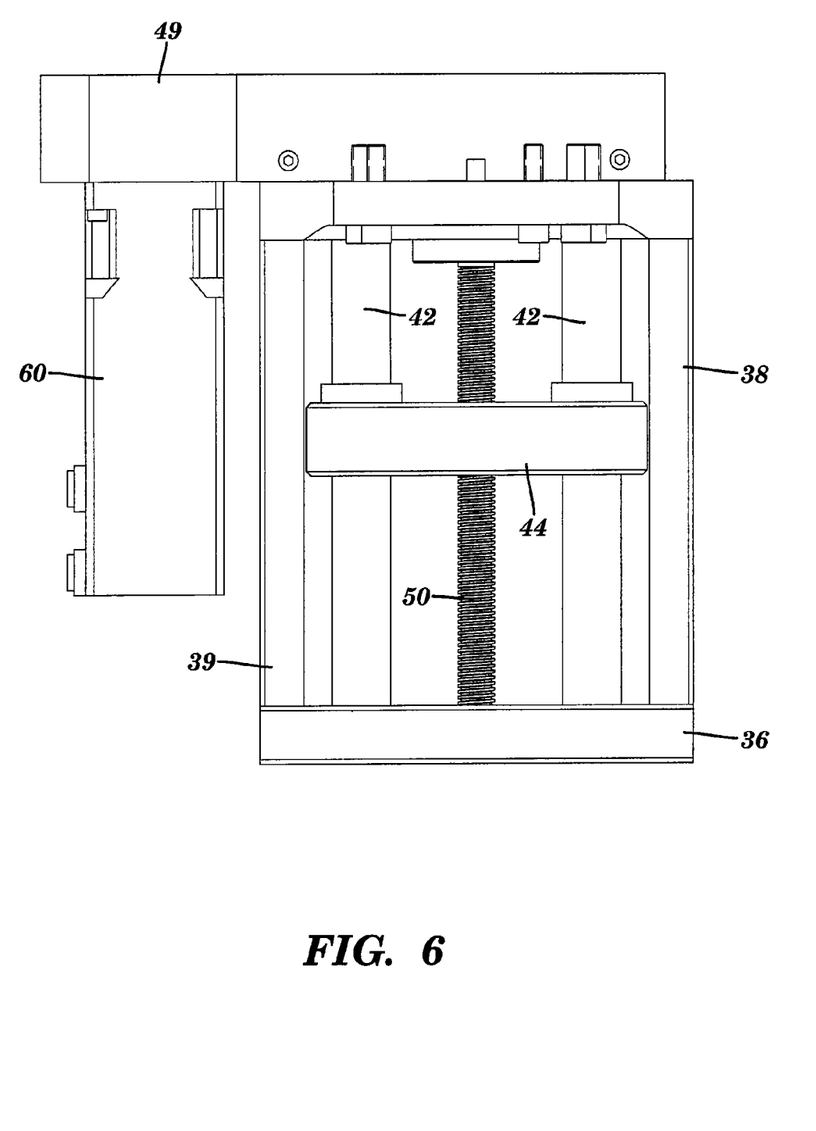
FIG. 6 is a rear elevation view of the gripping device shown in FIG. 2.

FIG. 2 is a perspective view of the gripping device 20 shown in FIG. 1. FIG. 3 is a front elevation view of gripping device 20; FIG. 4 is a left side elevation view of gripping device 20; FIG. 5 is a top plan view of gripping device 20; and FIG. 6 is a rear elevation view of gripping device 20.

As shown in FIGS. 2-6, gripping device 20 includes a housing 32 having a top plate 34, a bottom plate 36, and at least one side plate 38, 39 mounted between top plate 34 and bottom plate 36. Top plate 34, bottom plate 36, and one or more side plates 38, 39 may be fabricated or assembled by conventional means, for example, by welding, casting, forging, machining from a stock piece, or a plurality of mechanical fasteners 40, for instance, socket head cap screws. Gripping device 20 includes a plurality of rods 42, for example, at least two rods, but typically three or four rods, mounted between top plate 34 and bottom plate 36. Rods 42 may typically be mounted to top plate 34 and bottom plate 36 by means of mechanical fasteners, such as socket head cap screw or nuts, such as, M20-1.5-6H DIN hex head jam nuts. Though illustrated as circular cylindrical in shape in FIGS. 2-6, rods 42 may be any cylindrical shape while providing the desired guidance and support to movable plate 44 (discussed below). Rods 42 may be circular, oval, or polygonal in cross section, for example, triangular, square, or rectangular in cross section, among other polygonal shapes. Rods 42 may also be solid or hollow, for example, tubular in shape. Side plates 38, 39 may include one or more through holes 41, for example, to reduce the weight of gripping device 20 and/or provide access to the inside of housing 32 for servicing or routing of electrical cables or fluid hoses.

Gripping device 20 also includes at least one movable plate 44 mounted for translation along the plurality of rods 42 between top plate 34 and bottom plate 36. In order to grasp work piece 16, griping device 20 includes at least two opposing jaws: a first or upper jaw plate 46 extending from movable plate 44 and a second or lower jaw plate 48 extending from bottom plate 36. Gripping device 20 also includes at least one means for translating movable plate 44 along the plurality of rods 42 wherein first jaw plate 46 approaches second jaw plate 48 to engage work piece 16 therebetween, for example, whereby work piece 16 may be transferred from one position to another position, for instance, for subsequent EDM machining. In the aspect of the invention shown in FIGS. 2-6, movable plate 44 translates toward stationary bottom plate 36; however it will be understood by those of skill in the art that plate 44 may be stationary and bottom plate 36 may be adapted to be translated toward stationary plate 44 whereby second jaw 48 approaches first jaw 46. In another aspect, both plate 44 and bottom plate 36 may be movable, whereby jaw plates 46 and 48 both translate toward each other whereby work piece 16 may be grasped therebetween. In another aspect of the invention, at least one of upper jaw plate 46 and lower jaw plate 48 may translate away from the other plate to engage a work piece. For example, jaw plates 46 and 48 may separate or move away from each other to engage an internal cavity or indentation on work piece 16 to secure work piece 16.

The means for translating movable plate 44 (or movable bottom plate 36) may comprise any means by which jaw plate 46 on movable plate 44 may be translated toward jaw plate 48 on bottom plate 36. The means for translating may comprise one or more of pneumatic means, for example, employing one or more pneumatic cylinders; hydraulic means for example, employing one or more hydraulic cylinders; electrical means, for example, employing one or more motors, controllers, cables, and the like; mechanical means, for example, a mechanical drive train employing one or more mechanical power transmission components, for example, one or more belts, sheaves, chains, sprockets, gears, cams, splines, screws, shafts, couplings, bearings, seals, and the like, or a combination thereof. Gripping device 20 may include a protective cover 49 for the means for translating movable plate 44 mounted to housing 32, for example, by screws 51. Cover 49 may include one or more couplings (not shown) to permit access to cover 49 for wires, cables, or hoses, for example, for instrumentation, monitoring, and control.

As shown most clearly in FIG. 3, according to one aspect of the invention, the means for translating movable plate 44 may comprise a drive train including at least one lead screw 50 driven by a motor 60 by means of one or more belts 52. Motor 60 may be mounted to housing 32, for example, by means of mechanical fasteners and related hardware, for instance, bolted to a motor mounting plate 61 mounted to housing 32. Motor 60 may be a stepper motor or a servomotor, for example, a servomotor provided by FANUC. As shown most clearly in FIGS. 3 and 5, a driven sheave 54 may be mounted to lead screw 50 and a drive sheave 56 may be mounted to the output shaft of motor 60, for example, by means of a key, whereby the torque provided by motor 60 is transferred via belt 52 to lead screw 50. The belt 52 and sheaves 54 and 56 may be any conventional belt and sheave arrangement, for example, a v-belt type or a flat belt. However, in the aspect shown in FIG. 5, belt 52 is a toothed elastomeric belt, for example, a timing-type belt, and sheaves 54 and 56 are corresponding toothed sheaves, for example, sheaves provided by Browning, or their equivalent. As shown in FIG. 5, the tension in belt 52 may be adjusted by means of a belt-tensioning device 53 as is conventional, for example, a device having a belt tension adjusting screw. In another aspect, a chain and sprockets or a plurality of gears may be mounted in place of sheaves 54 and 56 to provide the drive train for lead screw 50.

As shown n FIG. 3, lead screw 50 may be mounted for rotation in top plate 34 and bottom plate 36. For example, plates 34 and 36 may include one or more antifriction bearings adapted to allow lead screw 50 to rotate with little or no interference. As shown in FIG. 3, top plate 34 may include one or more roller bearings 63, for example, one or more J132 roller bearing provided by MRC Bearing, or its equivalent. Bearings 63 may typically be retained on lead screw 50 by a lock nut 62, for example, a TLN-01 lock nut, or its equivalent. One or more bearings 63 may be protected from foreign material by means of one or more seal rings 64. Lead screw 50 may also include a sleeve 66, for example, a hardened sleeve at either end of leadscrew 50, to minimize damage to lead screw 50. Similarly, bottom plate 36 may include one or more antifriction bearings, such as a low friction bushing 68, for example, made from a graphite/metal alloy, such as, Graphaloy® graphite/metal alloy provided by Graphite Metallizing Corporation of Yonkers, N.Y., or its equivalent As shown in FIGS. 2-6, movable plate 44 may also include additional components to assist in its translation and orientation. Movable plate 44 may include one or more nuts 70 that cooperate with leadscrew 50 to translate movable plate 44 when lead screw 50 is rotated. Nut 70 may be mounted in movable plate 44 by conventional means, for example, by means of fasteners or press fit. Lead screw 50 and nut 70 may have any appropriate screw thread that will effectively translate plate 44 when leadscrew 50 is rotated. In one aspect, lead screw 50 and nut 70 include complementary ACME screw threads. Movable plate 44 may include one or more bushings 72 through which rods 42 pass. Bushings 72 may be antifriction bearings that minimize or eliminate friction between movable plate 44 and rods 42. Bushings 72 may be made from a graphite/metal alloy, such as, Graphaloy® graphite/metal alloy, or an equivalent material. According to aspects of the invention, the plurality of rods 42 minimize or prevent misalignment of the movable plate 44 from the desired orientation of plate 44 and the jaw plate 46 mounted to movable plate 44.

As shown in FIGS. 2-6, gripping device 20 may also include means for mounting gripping device 20 to a robotic manipulator, such as, manipulator 12 shown in FIG. 1. Though any kind of conventional interface by which gripping device 20 may be engaged by a robotic arm end may be used, as shown in FIGS. 2-6, gripping device 20 may include a projection or extension 74 adapted to engage a FANUC M710i robot wrist plate. Projection 74 may be a separate plate mounted to top plate 34, for example, by mechanical fasteners, or projection 74 may an integral part of top plate 34, for example, top plate 34 and projection 74 may be fabricated from a single plate. According to this aspect, in order to engage a FANUC M710i robot wrist plate, projection 74 includes a through hole 76 and a plurality of equally spaced screws 78, for example, socket head cap screws, threaded through threaded holes in projection 74 or threaded into a robot wrist plate (not shown). Screws 78 may also be studs threaded into threaded through holes or threaded blind holes in projection 74.

As shown in FIGS. 2 and 4, first or upper jaw plate 46 and second or lower jaw plate 48 may be separate plates mounted to movable plate 44 and bottom plate 36, respectively, for example, by mechanical fasteners 45 and 47, or first or upper jaw 46 and second or lower jaw 48 may an integral parts of movable plate 44 and bottom plate 36, respectively, for example, fabricated from a single plate.

Housing 32, including top plate 34, bottom plate 36, and side plates 38, 39; rods 42; movable plate 44; upper jaw 46; and lower jaw 48 may be fabricated from any appropriate structural material, including iron, steel, stainless steel, aluminum, titanium, nickel, magnesium, brass, or bronze, among other structural metals. In one aspect, gripping device 20 and its components are fabricated from stainless steel, for example, AISI 304 or AISI 316 stainless steel.

Figure 7:
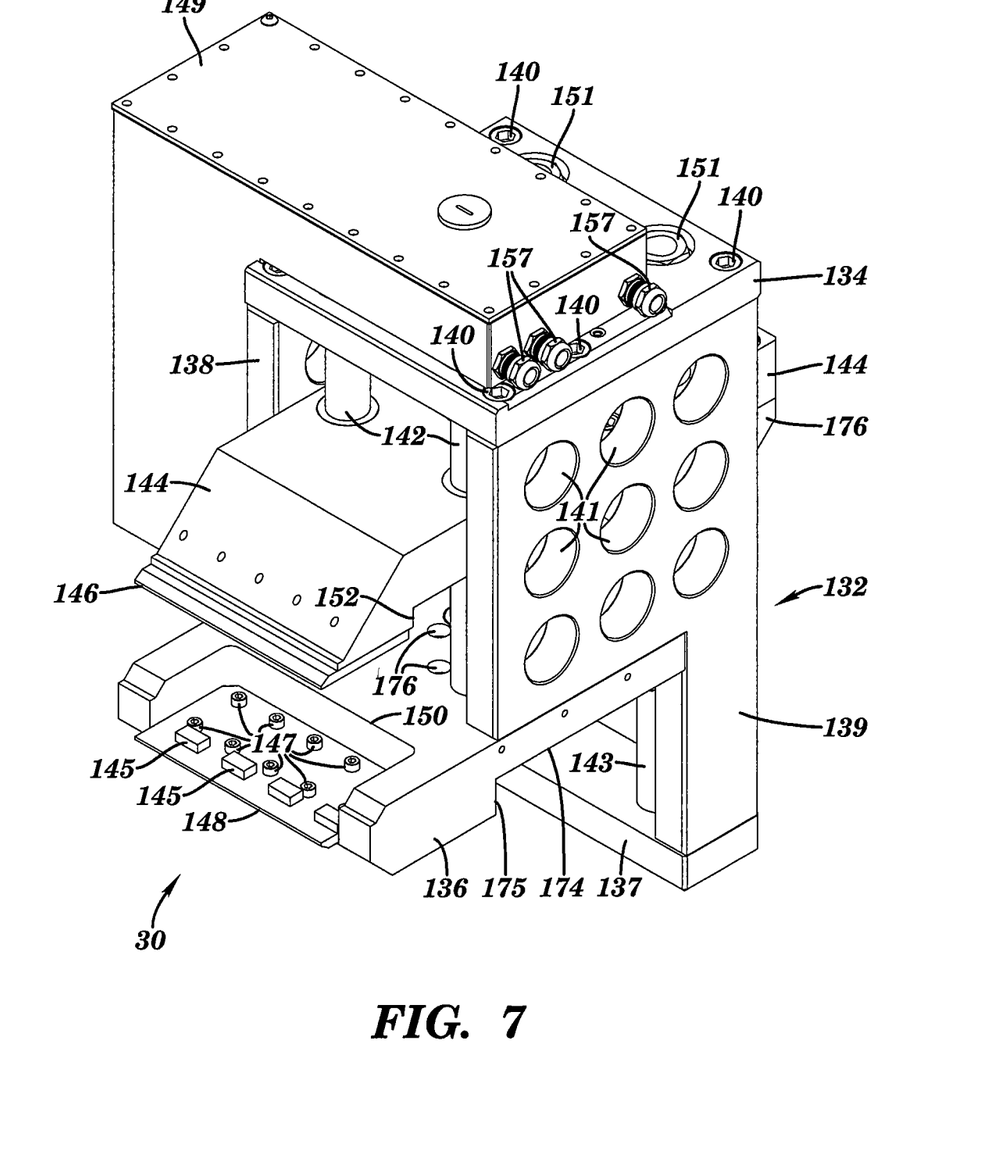
FIG. 7 is a perspective view of another gripping device shown in FIG. 1.
Figure 8:
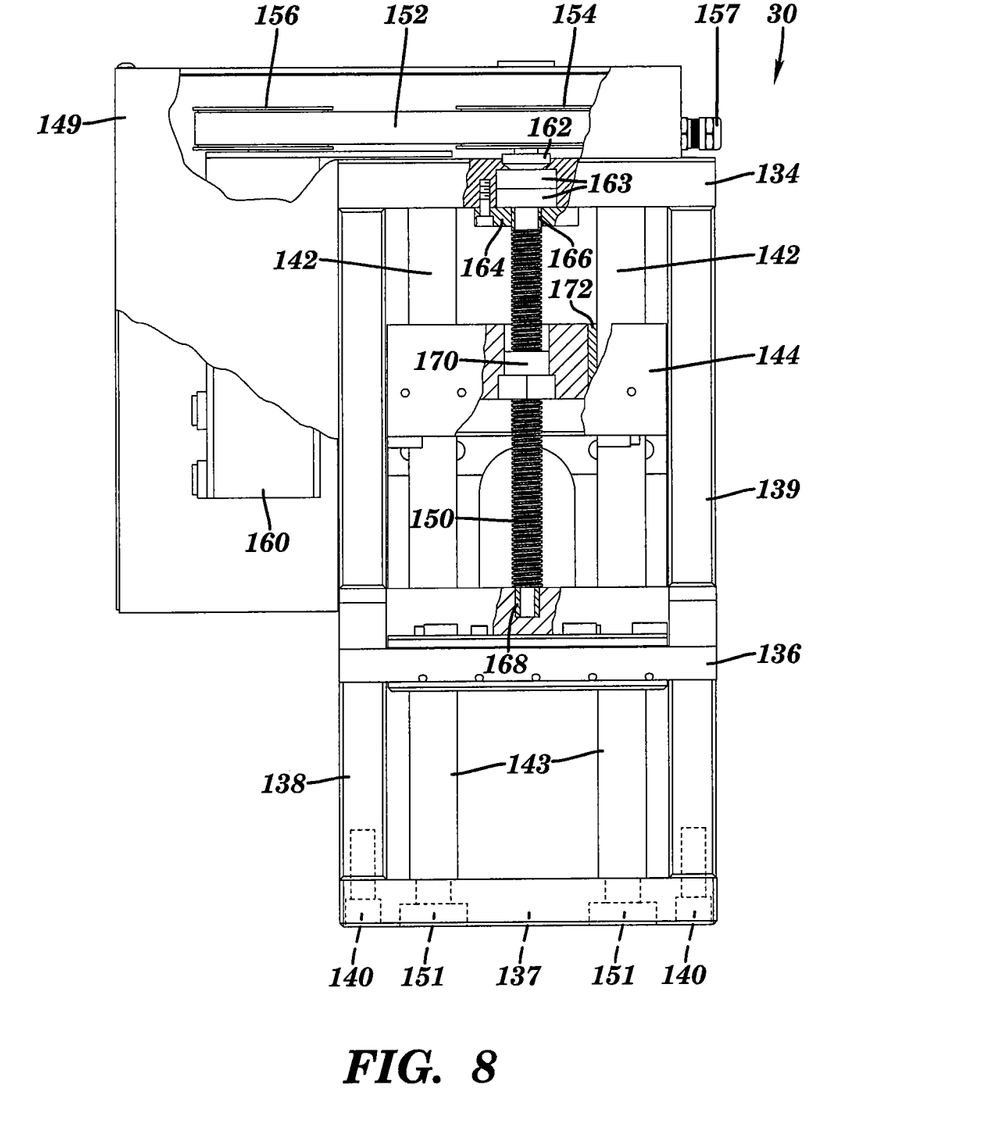
FIG. 8 is a front elevation view, partially in cross section, of the gripping device shown in FIG. 7.
Figure 9:
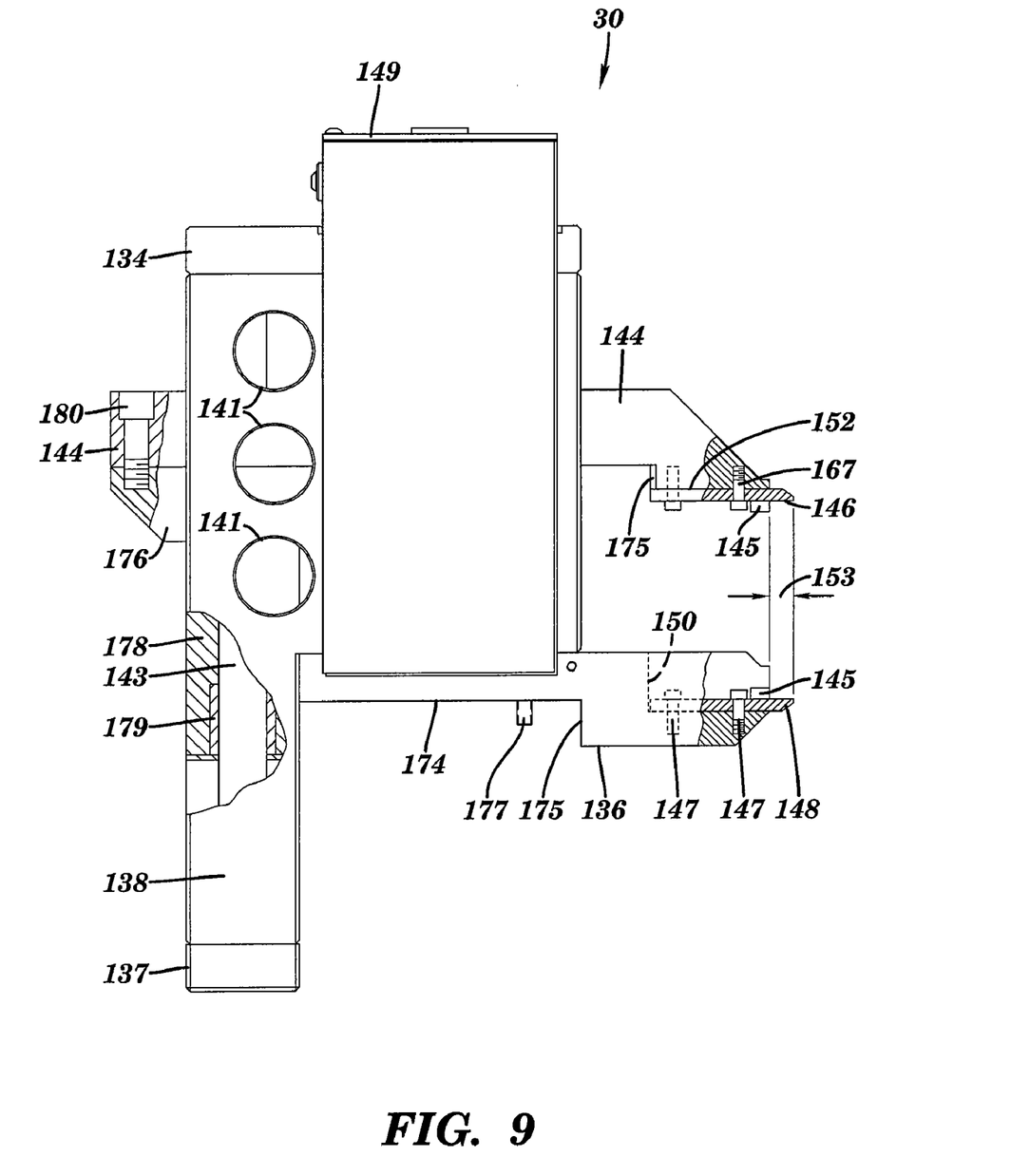
FIG. 9 is a left side elevation view, partially in cross section, of the gripping device shown in FIG. 7.
Figure 10:
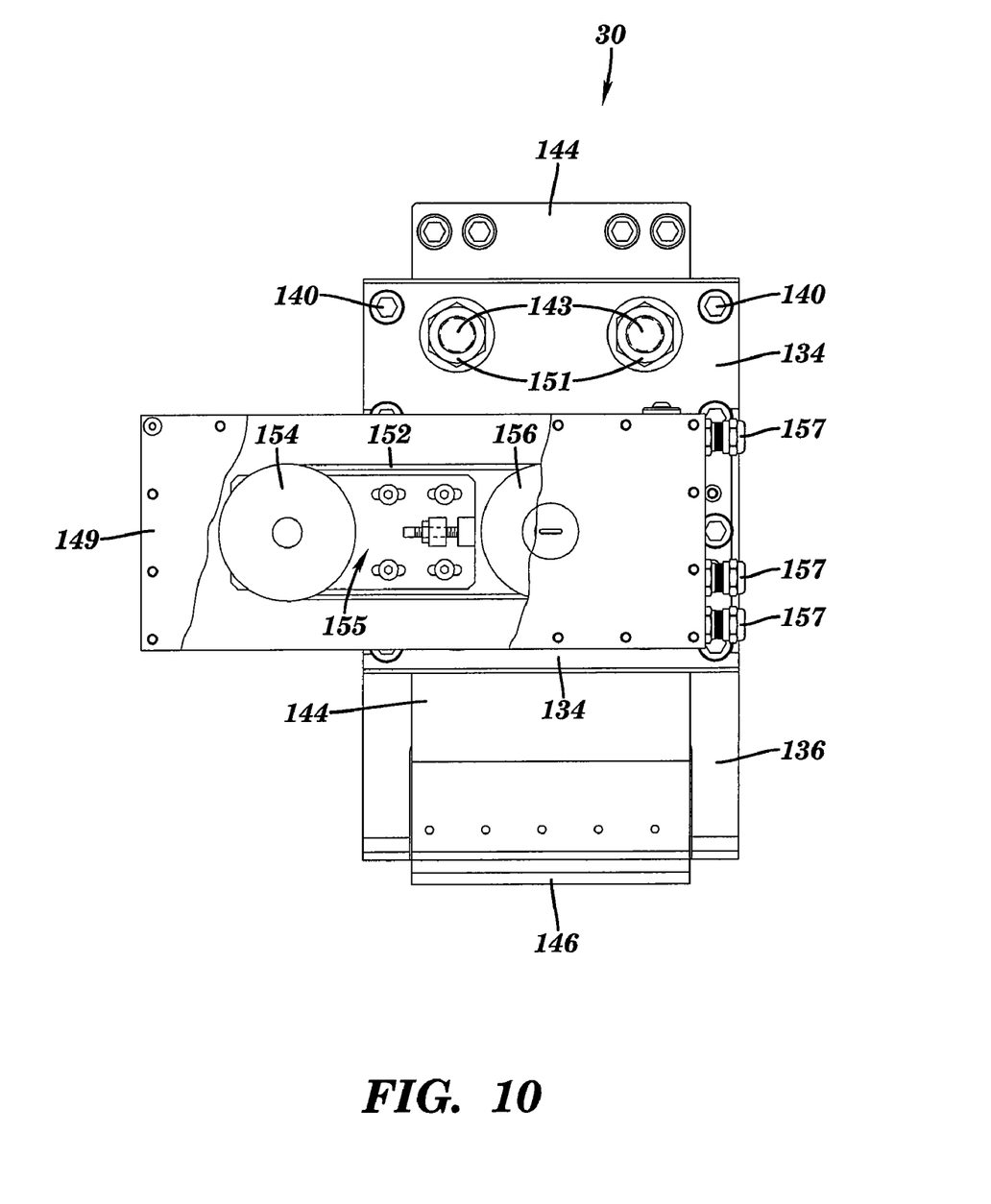
FIG. 10 is a top plan view of the gripping device shown in FIG. 7 with a cover partially removed to show details.
Figure 11:
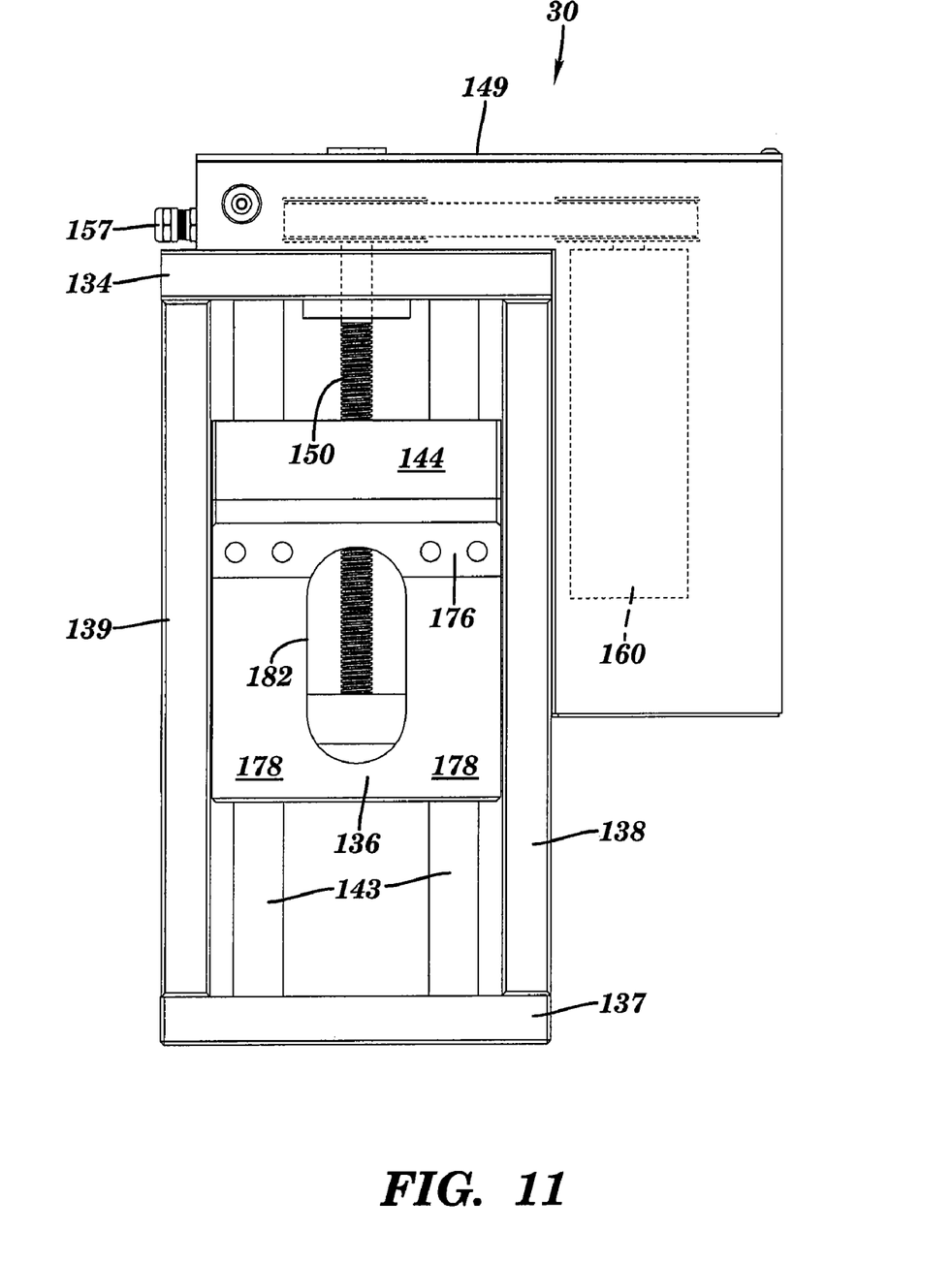
FIG. 11 is a rear elevation view of the gripping device shown in FIG. 7.

FIG. 7 is a perspective view of the gripping device 30 shown in FIG. 1. FIG. 8 is a front elevation view of gripping device 30; FIG. 9 is a left side elevation view of gripping device 30; FIG. 10 is a top plan view of gripping device 30; and FIG. 11 is a rear elevation view of gripping device 30.

In many respects, gripping device 30 is similar in construction and operation to gripping device 20 described above. As shown in FIGS. 7-11, gripping device 30 includes a housing 132 having a top plate 134, a bottom plate 136, and at least one side plate 138, 139 mounted between top plate 134 and bottom plate 136. In one aspect of the invention, gripping device 30 may also include a lower plate 137. Lower plate 137 may be positioned below bottom plate 136, may be mounted to side plate 138, 139, and, for example, may provide greater structural rigidity to housing 132. Top plate 134, bottom plate 136, lower plate 137, and one or more side plates 138, 139 may be assembled by conventional means, as discussed above with respect to device 20, for example, by welding or a plurality of mechanical fasteners 140, for instance, socket head cap screws. According to aspects of the invention, gripping device 30 includes a plurality of rods 142 and 143, for example, at least two rods, but typically three or four rods, mounted between top plate 134, bottom plate 136 and lower plate 137. Rods 142, 143 may typically be mounted to top plate 134, bottom plate 136, and lower plate 137 by means of mechanical fasteners. For example, the ends of rods 142 may be threaded and mounted to plates 134, 136, and 137 by nuts 151, for example, M20-1.5-6H DIN hex head jam nuts. Rods 142 may also have threaded recesses in their ends and may be mounted by means of screws, such as socket head cap screws. As shown in FIG. 7, rods 142 and 143 may vary in length, for example, rods 142 may be shorter and extend between top plate 134 and bottom plate 136 and rods 143 may be longer and extend from top plate 134 to lower plate 137. As discussed above with respect to rods 42, though illustrated as circular cylindrical in shape in FIGS. 7-11, rods 142 and 143 may be any cylindrical shape while providing the desired guidance and support for movable plate 144 (discussed below). Rods 142 and 143 may be circular, oval, or polygonal in cross section, for example, triangular, square, or rectangular in cross section, among other polygonal shapes. Rods 142 and 143 may also be solid or hollow, for example, tubular in shape. Side plates 138, 139 may include one or more through holes 141, for example, to reduce the weight of gripping device 30 and/or provide access to the inside of housing 132 for servicing or routing of electrical cables or fluid hoses.

Similar to gripping device 20, gripping device 30 also includes at least one movable plate 144 mounted for translation along the plurality of rods 142, 143 between top plate 134 and bottom plate 136. In order to grasp work piece 16, gripping device 30 includes at least two opposing jaws or jaw plates: a first or upper jaw plate 146 extending from movable plate 144 and a second or lower jaw plate 148 extending from bottom plate 136. Gripping device 30 also includes at least one means for translating movable plate 144 along the plurality of rods 142, 143 wherein first jaw plate 146 approaches second jaw plate 148 to engage work piece 16 therebetween, for example, in a position and with sufficient rigidity whereby machining, for example, EDM machining, may be effectively practiced on work piece 16, for instance, by EDM tool 26 shown in FIG. 1.

In the aspect of the invention shown in FIGS. 7-11, movable plate 144 translates toward stationary bottom plate 136; however it will be understood by those of skill in the art that plate 144 may be stationary and bottom plate 136 may be adapted to be translated toward stationary plate 144 whereby second jaw plate 148 approaches first jaw plate 146. In another aspect, both plate 144 and bottom plate 136 may be movable, whereby jaw plates 146 and 148 both translate toward each other whereby work piece 16 may be grasped therebetween. In another aspect of the invention, at least one of upper jaw plate 146 and lower jaw plate 148 may translate away from the other plate to engage a work piece. For example, jaw plates 146 and 148 may separate to engage an internal cavity or indentation on work piece 16 to secure work piece 16.

The means for translating movable plate 144 (or movable bottom plate 136) may comprise any one of the means or drive trains described above with respect to gripping device 20, including pneumatic means, hydraulic means, electrical means, mechanical means, or combinations thereof. As shown in FIGS. 7-11, according to one aspect of the invention, the means for translating movable plate 144 may comprise a drive train including a lead screw 150 driven by a motor 160 by means of one or more belts 152. Motor 160 may be mounted to housing 132, for example, by means of mechanical fasteners. Motor 160 may be a stepper motor or a servomotor, for example, a servomotor provided by FANUC. As shown most clearly in FIGS. 8 and 10, a driven sheave 154 may be mounted to lead screw 150 and a drive sheave 156 may be mounted to the output shaft of motor 160, for example, by means of a key, whereby the torque provided by motor 160 is transferred via belt 152 to lead screw 150. The belt 152 and sheaves 154 and 156 may be any conventional belt and sheave arrangement, for example, a v-belt type or a flat belt. However, in the embodiment shown in FIG. 10, belt 152 is a toothed elastomeric belt, for example, a timing-type belt, and sheaves 154 and 156 are corresponding toothed sheaves, for example, sheaves provided by Browning, or their equivalent. As shown in FIG. 10, the tension in belt 152 may be adjusted by means of a belt-tensioning device 155 as is conventional, for example, a device having a belt tension adjusting screw. In another aspect, a chain and sprockets or a plurality of gears may be provided in place of sheaves 154 and 156 to provide the drive train for lead screw 150. Gripping device 30 may include a protective cover 149 for the means for translating movable plate 144 mounted to housing 132, for example, by screws. As shown in FIGS. 7-11, the protective cover 149 for gripping device 30 may include a cover extension 159 enclosing motor 160 whereby gripping device 30 may be immersible, for example, immersible in the dielectric fluid in vessel 22 shown in FIG. 1, without damaging the motor 160 or drive train. Cover 149 and cover extension 159 may be provided with appropriate sealing means, such as elastomeric gaskets, to minimize or prevent leakage of liquid under cover 149 and extension 159. Cover 149 may include one or more couplings 157 to permit access to cover 149 for wires, cables, or hoses, for example, for instrumentation, monitoring, and control.

As shown in FIG. 8, lead screw 150 may be mounted for rotation in top plate 134 and bottom plate 136. For example, plates 134 and 136 may include one or more antifriction bearings adapted to allow lead screw 150 to rotate with little or no interference. As shown in FIG. 8, top plate 134 may include one or more roller bearings 163, for example, one or more J1232 roller bearing provided by MRC Bearing, or its equivalent. Bearings 163 may typically be retained on lead screw 150 by a lock nut 162, for example, a TLN-01 lock nut, or its equivalent. One or more bearings 163 may be protected from foreign material by means of one or more seal rings 164. Lead screw 150 may also include a sleeve 166, for example, a hardened metal sleeve at either end of lead screw 150, to minimize damage to lead screw 150. Similarly, bottom plate 136 may include one or more antifriction bearings, such as a low friction bushing 168, for example, made from a graphite/metal alloy, such as, Graphaloy® graphite/metal alloy, or its equivalent As shown in FIG. 8, movable plate 144 may also include additional components to assist in its translation and orientation. Movable plate 144 may include one or more nuts 170 that cooperate with lead screw 150 to translate movable plate 144 when lead screw 150 is rotated. Nut 170 may be mounted in movable plate 144 by conventional means, for example, by means of fasteners or press fit. Lead screw 150 and nut 170 may have any appropriate screw thread that will effectively translate plate 144 when leadscrew 150 is rotated. In one aspect, lead screw 150 and nut 170 include complementary ACME screw threads. Movable plate 144 may include one or more bushings 172 through which rods 142 pass. Bushings 172 may be antifriction bearings that minimize or eliminate friction between movable plate 144 and rods 142. Bushings 172 may be made from a graphite/metal alloy, such as, Graphaloy® graphite/metal alloy, or an equivalent material. According to aspects of the invention, the plurality of rods 142 and 143 minimize or prevent misalignment of the movable plate 144 from the desired orientation of plate 144 and the jaw plate 146 mounted to movable plate 144.

As shown in FIGS. 7 and 9, gripping device 30 may also include means for mounting gripping device 30 to a structure, for example, to a tank or vessel, for instance, tank 22 in FIG. 1. That is, gripping device may be adapted to substantially rigidly mount to a structure whereby gripping device 30 may substantially rigidly support a work piece whereby the work piece may be accurately machined. Though gripping device 30 may be adapted to mount to any kind of structural support, in one aspect, gripping device may be adapted to mount to a rail in an EDM tank, for example, to a rail 23 in tank 22 shown in FIG. 1. As shown in FIGS. 7 and 9, gripping device 30 may include a lower surface 174 of bottom plate 136 that is adapted to mount to a structure, for example, a rail. Surface 174 may includes a plurality of through holes 176 through which threaded fasteners, such as, socket head cap screws, can be inserted to engage threaded holes in a horizontal surface, such as the surface of rail 23 in tank 22 of FIG. 1. As shown in FIG. 9, surface 174 may also include one or more dowel pins 177 that may engage one or more dowel pin holes in a mating surface to assist in locating and aligning gripping device 30 on the surface. Surface 174 may also be recessed into plate 136 whereby a surface 175, for example, a surface substantially perpendicular to surface 174, may be provided to aid in the engagement of, for example, rail 23. It will be appreciated by those of skill in the art that other surfaces of gripping device 30 may also be adapted to mount to a structure, such as rail 23, for example, the outer surfaces of side plates 138 or 139, or the upper surface of top plate 134, among others.

As shown in FIGS. 7 and 9, first or upper jaw plate 146 and second or lower jaw plate 148 may be separate plates mounted to movable plate 144 and bottom plate 136, respectively, for example, by mechanical fasteners 147 and 167, or first or upper jaw 146 and second or lower jaw 148 may an integral parts of movable plate 144 and bottom plate 136, respectively, for example, fabricated from a single plate. According to one aspect of the invention, this removable mounting of jaw plates 146 and 148 to plates 144 and 136, respectively, permit jaw plates 146 and 148 to be removed, for example, for inspection, servicing, and/or replacement, for instance, when damaged. For example, in the aspect of the invention where gripping device 30 is used for retaining a work piece in an EDM machining operation, should errors occur in the machining process whereby jaw plate 146 and/or jaw plates 148 is inadvertently damaged in the machining process, jaw plate 146 and/or plate 148 may be removed for repair or replacement. Replaceable jaw plates 146 and 148 of varying size, shape, dimension, or orientation may also be used to accommodate work pieces 16 of varying size, shape, dimension, or orientation.

Upper jaw plate 146 and lower jaw plate 148 may also include one or more structures that act as guides or stops for the work piece being machined. As shown in FIGS. 7 and 9, upper jaw plate 146 and lower jaw plate 148 may include a plurality of blocks 145 mounted to function as guides or stops to the insertion of a work piece between jaw plates 146 and 148, that is, to limit the length of engagement of jaw plates 146 and 148 with the work piece 16. As shown in FIG. 9, the length of engagement 153 is provided by stops 145 and the ends of jaw plates 146 and 148. The length of engagement 153 may vary from about 0.125 inches to about 6 inches, depending upon the size of the work piece, but is typically between about 0.25 inches and 1 inch, for example, about 0.375 inches. According to one aspect of the invention, though the work piece may be engaged by only about 0.375 inches, gripping device 30 is capable of maintaining the flatness of the work piece very accurately, for example, due to the stiffness of the gripping device 30. For instance, the flatness of the work piece may be maintained to a flatness of at least about 0.010 inches, but can achieve flatness of at least 0.003 inches. The length of the work piece that engages jaw plates 146 and 148 may vary broadly depending upon the size of gripping device 30; however, the length of the work piece, that is, in the direction extending from gripping device 30, may range from about 0.125 inches to about 3 feet, but is typically between about 5 inches and about 7 inches. The thickness of the work piece that engages jaw plates 146 and 148 may vary broadly depending upon the size of gripping device 30; however, the thickness of the work piece may range from about 0.125 inches to about 6 inches, but is typically between about 0.25 inches and about 3 inches. The width of the work piece that engages jaw plates 146 and 148 may vary broadly depending upon the size of gripping device 30; however, the width of the work piece may range from about 0.125 inches to about 3 feet, but is typically between about 3 inches and about 9 inches. Upper jaw plate 146 and lower jaw plate 148 may also be beveled or tapered, for example, to minimize the likelihood of interference between the plates 146 and 148 with the machine tool, for example, the EDM wire.

As also shown in FIGS. 7 and 9, lower jaw plate 148 may be mounted in a cavity or recess 150 in bottom plate 136 and upper jaw plate 146 may be mounted to a boss or projection 152 on movable plate 144. Projection 152 may be sized to be inserted into cavity 150. As will be recognized by those skilled in the art, recess 150 may also be provided in plate 144 and projection 152 may also be provided in plate 136. In one aspect, recess 150 in plate 136 may be provided to position the surface of plate 148 at a desired elevation. For example, the elevation of the surface of plate 148 may be provided to mimic the elevation of a typical mounting surface in a machine tool, for example, the elevation of rail 23 shown in FIG. 1. For instance, the elevation of the surface of plate 148 may be about equal to the elevation of surface 174 of gripper 30, that is, about equal to the elevation of a surface typically mounted to, for example, rail 23.

As shown most clearly in FIGS. 7, 9, and 11, the rigidity of movable plate 144 may be increased. The increase in rigidity may be provided by increasing the thickness of plate 144, for example, in the vicinity of rods 143, or by providing one or more extensions 178 to plate 144 that engage rods 143. This increase in thickness or the extensions 178 may be provided by the fabrication process, for example, machined, forged, or cast, or may be provided by mounting one or more plates to plate 144 with mechanical fasteners. As shown in FIGS. 9 and 11, one or more plates 176 having extensions 178 may be mounted to movable plate 144 by a plurality of fasteners 180, for example, socket head cap screws. Extensions 178 may include antifriction bearings, such as, guide journals 179 that engage rods 143. Extensions 178 may also comprise a single structure or plate through which rods 143 extend. However, in one aspect, as shown in FIG. 11, a recess or cavity 182 may be provided in the extension 178, for example, to reduce the weight of extension 178 while providing the desired stiffness.

Similar to gripping device 20, device 30 including housing 132, top plate 134, bottom plate 136, lower plate 137, side plates 138, 139; rods 142, 143; movable plate 144, upper jaw 146 and lower jaw 148 may be fabricated from any appropriate structural material as identified above for gripping device 20. In one aspect, gripping device 30 and its components are fabricated from stainless steel, for example, AISI 304 or AISI 316 stainless steel.

According to aspects of the present invention, and as shown in FIG. 1, a work piece 16 may be positioned in a machining station 21 while minimizing or eliminating the amount and cost of tooling that characterizes prior art systems. Again, though the above and the following discussion may be limited to the application of aspects of the invention to wire-EDM type machining, aspects of the invention are applicable to any machining process for which the work piece may be accurately positioned in a machining station.

As shown in FIG. 1, work piece 16 may be conveyed to a position that is accessible by robot 12 by conveyor 15, for example, a belt conveyor. Under the control of a conventional control system (not shown), for example, one provided by FANUC, robot 12 is instructed to position gripping device 20 adjacent to work piece 16 whereby gripping device 20 can grip work piece 16. Under automated control from the control system, the movable plate 44 of gripping device 20 having jaw plate 46 is translated by means of motor 60 and belt 52 to rotate lead screw 50 whereby work piece 16 is engaged between jaw plate 46 and jaw plate 48. Thus engaged, robot 12 is instructed to move and position gripping device 20 and work piece 16 into machining station 21, for example, a wire-EDM machining station having a wire-EDM tool 26, whereby gripping device 30 may engage work piece 16. When properly positioned, for example, as indicated by an optical detector or indicated by a positioning algorithm associated with robot 12, the movable plate 144 having jaw plate 146 on gripping device 30 is translated by means of motor 160 and belt 152 to rotate lead screw 150 whereby work piece 16 is engaged between jaw plate 146 and jaw plate 148. Thus engaged, vessel 22 may then be filled with dielectric fluid to level 24 and machining station 21 may then engage work piece 16, for example, with wire-EDM tool 26, to machine work piece 16 as desired.

Again, though aspects of the invention were described for illustrative purposes for use with wire EDM machining, it is understood that aspects of the present invention may be applied to any machining or treatment operation requiring the handling of work pieces. These processes or treatments include, but are not limited to, milling, drilling, turning, cutting, or other conventional machining process, or inspection, cleaning, painting, and like conventional treatments.

While several aspects of the present invention have been described and illustrated herein, alternative aspects may be conceived by those skilled in the art to accomplish the same or equivalent objectives. Accordingly, it is intended by the appended claims to cover all such alternative aspects as fall within the true spirit and scope of the invention.

The invention claimed is:

1. A method for handling a work piece for an EDM (Electrical Discharge Machining) machining process, the method comprising:
   providing the work piece in a first position;
   grasping the work piece with a first automated gripping device mounted to a robotic manipulator;
   transferring the work piece with the robotic manipulator from the first position to a second position in a vessel where the work piece can be accessed by an EDM machine tool;
   introducing a dielectric fluid to the vessel; and
   grasping the work piece in the second position with a second automated gripping device wherein the work piece is positioned for machining by the EDM machine tool.

2. The method as recited in claim 1, wherein the machine tool comprises a wire EDM machine tool.

3. The method as recited in claim 1, wherein grasping the work piece with the first automated gripping device comprises grasping the work piece between a first jaw and a second jaw of the first automated gripping device.

4. The method as recited in claim 3, wherein the second jaw is stationary, and wherein grasping the work piece between the first jaw and the second jaw comprises translating the first jaw toward the stationary second jaw.

5. The method as recited in claim 1, wherein grasping the work piece with the second automated gripping device comprises grasping the work piece between a first jaw and a second jaw of the second automated gripping device.

6. The method as recited in claim 5, wherein the second jaw is stationery, and wherein grasping the work piece between the first jaw and the second jaw comprises translating the first jaw toward the stationary second jaw.

7. The method as recited in claim 1, wherein the method further comprises releasing the work piece from the grasp of the first automated gripping device and removing the first automated gripping device from the vessel.

8. The method as recited in claim 1, wherein the method further comprises electrical discharge machining the work piece.

9. A system for handling a work piece for an EDM machining process, the system comprising:
   a robotic manipulator;
   a first automated gripping device mounted to the robotic manipulator and adapted to grip a work piece located in a first position;
   a second automated gripping device adapted to receive and retain the work piece in a second position located in a vessel including at least some dielectric fluid for machining by an EDM machine tool; and
   means for controlling the operation of the robotic manipulator, the first gripping device, and the second gripping device to position the first gripping device whereby the first gripping device grips the work piece, the robotic manipulator transfers the work piece from the first position to the second position, and the second gripping device grips the work piece to retain the work piece in a the second position whereby the work piece can be machined by the EDM machine tool.

10. The system as recited in claim 9, wherein machine tool comprises a wire EDM tool.

11. The system as recited in claim 9, wherein the first automated gripping device comprises a first jaw and a second jaw adapted to engage the work piece therebetween.

12. The system as recited in claim 11, wherein the second jaw is stationary and the first jaw is mounted for translation toward the second jaw.

13. The system as recited in claim 9, wherein the second automated gripping device comprises a first jaw and a second jaw adapted engage the work piece therebetween.

14. The system as recited in claim 13, wherein the system further comprises an electrical discharge machining tool adapted to machine the work piece in the second position.

* * * * *